(12) United States Patent
Bruening et al.

(10) Patent No.: US 8,065,739 B1
(45) Date of Patent: Nov. 22, 2011

(54) DETECTING POLICY VIOLATIONS IN INFORMATION CONTENT CONTAINING DATA IN A CHARACTER-BASED LANGUAGE

(75) Inventors: Oskar Bruening, Emeryville, CA (US); Vitali Fridman, Belmont, CA (US)

(73) Assignee: Symantec Corporation, Mountain View, CA (US)

( * ) Notice: Subject to any disclaimer, the term of this patent is extended or adjusted under 35 U.S.C. 154(b) by 842 days.

(21) Appl. No.: 12/079,719

(22) Filed: Mar. 28, 2008

(51) Int. Cl.
 *G06F 17/28* (2006.01)
(52) U.S. Cl. .................. 726/26; 704/2; 707/760
(58) Field of Classification Search .......... 707/756, 707/760
See application file for complete search history.

(56) References Cited

U.S. PATENT DOCUMENTS

| | | |
|---|---|---|
| 4,858,152 A | 8/1989 | Estes |
| 5,212,821 A | 5/1993 | Gorin et al. |
| 5,379,391 A | 1/1995 | Belsan et al. |
| 5,384,892 A | 1/1995 | Strong |
| 5,577,249 A | 11/1996 | Califano |
| 5,739,391 A | 4/1998 | Ruppel et al. |
| 5,796,948 A | 8/1998 | Cohen |
| 5,832,212 A | 11/1998 | Cragun et al. |
| 5,835,722 A | 11/1998 | Bradshaw et al. |
| 5,883,588 A | 3/1999 | Okamura |
| 5,884,033 A | 3/1999 | Duvall et al. |
| 5,892,905 A | 4/1999 | Brandt et al. |
| 5,958,015 A | 9/1999 | Dascalu |
| 5,960,080 A | 9/1999 | Fahlman et al. |
| 5,982,905 A | 11/1999 | Grodinsky et al. |
| 5,996,011 A | 11/1999 | Humes |
| 6,047,283 A | 4/2000 | Braun |
| 6,055,538 A | 4/2000 | Kessenich et al. |
| 6,065,056 A | 5/2000 | Bradshaw et al. |
| 6,073,142 A | 6/2000 | Geiger et al. |
| 6,094,689 A | 7/2000 | Embry et al. |
| 6,138,168 A | 10/2000 | Kelly et al. |
| 6,233,618 B1 | 5/2001 | Shannon |
| 6,266,775 B1 | 7/2001 | Kamba |
| 6,314,190 B1 | 11/2001 | Zimmermann |
| 6,321,224 B1 | 11/2001 | Beall et al. |
| 6,347,374 B1 | 2/2002 | Drake et al. |
| 6,360,215 B1 | 3/2002 | Judd et al. |

(Continued)

FOREIGN PATENT DOCUMENTS

CA 2 499 508 4/2004

(Continued)

OTHER PUBLICATIONS

Alonso, Omar, et al, Oracle Secure Enterprise Search 10g, An Oracle Technical White Paper, Mar. 2006, 21 pages.

(Continued)

*Primary Examiner* — Matthew Smithers
(74) *Attorney, Agent, or Firm* — Lowenstein Sandler PC

(57) ABSTRACT

A method and apparatus for detecting policy violations in information content containing data in a character-based language is described. In one embodiment, the method includes identifying a policy for protecting source data having a tabular format. The source data contains one or more data fragments in the character-based language. The method further includes receiving information content having at least a portion in the character-based language, and determining whether any part of the information content, including the portion in the character-based language, violates the policy.

25 Claims, 11 Drawing Sheets

U.S. PATENT DOCUMENTS

| | | | |
|---|---|---|---|
| 6,374,241 | B1 | 4/2002 | Lamburt |
| 6,396,513 | B1 | 5/2002 | Helfman et al. |
| 6,442,607 | B1 | 8/2002 | Korn et al. |
| 6,442,686 | B1 | 8/2002 | McArdle et al. |
| 6,453,338 | B1 | 9/2002 | Shiono |
| 6,507,846 | B1 | 1/2003 | Consens |
| 6,604,141 | B1 | 8/2003 | Ventura |
| 6,618,725 | B1 | 9/2003 | Fukuda et al. |
| 6,636,838 | B1 | 10/2003 | Perlman et al. |
| 6,639,615 | B1 | 10/2003 | Majumdar |
| 6,701,314 | B1 | 3/2004 | Conover et al. |
| 6,711,579 | B2 | 3/2004 | Balakrishnan |
| 6,714,936 | B1 | 3/2004 | Nevin |
| 6,732,087 | B1 | 5/2004 | Hughes et al. |
| 6,768,986 | B2 | 7/2004 | Cras et al. |
| 6,769,032 | B1 | 7/2004 | Katiyar et al. |
| 6,778,979 | B2 | 8/2004 | Grefenstette et al. |
| 6,779,120 | B1 | 8/2004 | Valente et al. |
| 6,829,613 | B1 | 12/2004 | Liddy |
| 6,829,635 | B1 | 12/2004 | Townsend |
| 6,871,284 | B2 | 3/2005 | Cooper et al. |
| 6,941,466 | B2 | 9/2005 | Mastrianni et al. |
| 6,965,886 | B2 | 11/2005 | Govrin et al. |
| 6,983,186 | B2 | 1/2006 | Navani et al. |
| 6,996,788 | B2 | 2/2006 | Akiba et al. |
| 7,003,562 | B2 | 2/2006 | Mayer |
| 7,114,185 | B2 | 9/2006 | Moore et al. |
| 7,130,885 | B2 | 10/2006 | Chandra et al. |
| 7,146,402 | B2 | 12/2006 | Kucherawy |
| 7,162,738 | B2 | 1/2007 | Dickinson, III et al. |
| 7,191,252 | B2 | 3/2007 | Redlich et al. |
| 7,203,749 | B2 | 4/2007 | Hiraga et al. |
| 7,222,158 | B2 | 5/2007 | Wexelblat |
| 7,237,008 | B1 | 6/2007 | Tarbotton et al. |
| 7,249,175 | B1 | 7/2007 | Donaldson |
| 7,320,004 | B1 | 1/2008 | DeLuca et al. |
| 7,472,114 | B1 | 12/2008 | Rowney et al. |
| 7,516,492 | B1 | 4/2009 | Nisbet et al. |
| 7,523,498 | B2 | 4/2009 | Fellenstein et al. |
| 2001/0037324 | A1 | 11/2001 | Agrawal et al. |
| 2002/0010679 | A1 | 1/2002 | Felsher |
| 2002/0069098 | A1 | 6/2002 | Schmidt |
| 2002/0073313 | A1 | 6/2002 | Brown et al. |
| 2002/0093676 | A1 | 7/2002 | Parry |
| 2002/0129140 | A1 | 9/2002 | Peled et al. |
| 2002/0138579 | A1 | 9/2002 | Goldberg |
| 2002/0178228 | A1 | 11/2002 | Goldberg |
| 2002/0198766 | A1 | 12/2002 | Magrino et al. |
| 2002/0199095 | A1 | 12/2002 | Bandini |
| 2003/0051026 | A1 | 3/2003 | Carter et al. |
| 2003/0093518 | A1 | 5/2003 | Hiraga |
| 2003/0149687 | A1* | 8/2003 | Brown et al. ............... 707/3 |
| 2004/0039991 | A1 | 2/2004 | Hopkins et al. |
| 2004/0193910 | A1 | 9/2004 | Moles |
| 2004/0225645 | A1 | 11/2004 | Rowney et al. |
| 2005/0027723 | A1 | 2/2005 | Jones et al. |
| 2005/0060537 | A1 | 3/2005 | Stamos et al. |
| 2005/0086252 | A1* | 4/2005 | Jones et al. ............. 707/102 |
| 2005/0138110 | A1 | 6/2005 | Redlich et al. |
| 2005/0182765 | A1 | 8/2005 | Liddy |
| 2005/0216771 | A1 | 9/2005 | Malcom |
| 2005/0257267 | A1 | 11/2005 | Williams et al. |
| 2006/0005247 | A1 | 1/2006 | Zhang et al. |
| 2006/0184549 | A1 | 8/2006 | Rowney et al. |
| 2006/0224589 | A1 | 10/2006 | Rowney et al. |
| 2007/0130255 | A1 | 6/2007 | Wolovitz et al. |
| 2007/0136788 | A1 | 6/2007 | Monahan et al. |
| 2008/0066150 | A1 | 3/2008 | Lim et al. |
| 2008/0263626 | A1 | 10/2008 | Bainter et al. |
| 2009/0292677 | A1* | 11/2009 | Kim ............................ 707/3 |
| 2010/0169970 | A1 | 7/2010 | Stolfo et al. |
| 2010/0251363 | A1 | 9/2010 | Todorovic |
| 2010/0332481 | A1 | 12/2010 | Rowney |

FOREIGN PATENT DOCUMENTS

| | | |
|---|---|---|
| CA | 2 597 083 | 8/2006 |
| GB | 2 343 030 A | 4/2000 |
| GB | 2466367 A | 6/2010 |
| JP | 2002-189643 | 5/2002 |
| JP | 2005-539334 | 12/2005 |
| JP | 2008-171101 | 7/2008 |
| JP | 2008-537195 | 9/2008 |
| WO | WO2004/027653 | 4/2004 |
| WO | WO2006/088952 | 8/2006 |

OTHER PUBLICATIONS

Attenex, Attenex Patterns Suite, http://www.attenex.com/products_services/attenex_patterns_suite.aspx, Downloaded Feb. 20, 2008, 2 pages.

Autonomy, Autonomy Group product overview, http://www.autonomy.com/content/products/index.en.html, Downloaded Feb. 20, 2008, 2 pages.

Autonomy, Security, http://www.autonomy.com/content/Technology/Technology_Benefits/security, Feb. 20, 2008, 2 pages.

Autonomy, Technology overview, http://www.autonomy.com/content/Technmology/index.en.html, Downloaded Feb. 20, 2008, 2 pages.

Autonomy, Limitations of Other Approaches, http://www.autonomy.com/content/Technology/Limitations_Other_Approaches, Downloaded Feb. 20, 2008, 2 pages.

Buchta, Stefan, Oracle Secure Enterprise Search Version 10.1.8.2, An Oracle Technical White Paper, Oct. 2007, 30 pages.

Cisco, A Report From Ironport Systems, "Data Loss Prevention Best Practices—Managing Sensitive Data in the Enterprise", 2007, 21 pages.

Clearwell Systems, The Clearwell E-Discovery Platform®, http://www.clearwellsystems.com/products/e-discovery-platform, Downloaded Feb. 20, 2008 2 pages.

Clearwell Systems, The Clearwell E-Discovery Platform: Analysis, http://www.clearwellsystems.com/products/e-discovery-analysis.php, Downloaded Feb. 20, 2008, 1 page.

Clearwell Systems, The Clearwell E-Discovery Platform: Case Management, http://www.clearwellsystems.com/products/e-discovery-case-management, Downloaded Feb. 20, 2008 2 pages.

Clearwell Systems The Clearwell E-Discovery Platform: Processing, http://www.clearwellsystems.com/products/e-discovery-processing.php, Downloaded Feb. 20, 2008, 2 pages.

Clearwell Systems The Clearwell E-Discovery Platform: Review, http://www.clearwellsystems.com/products/e-discovery-review.php, Downloaded Feb. 20, 2008 2 pages.

Clearwell Systems The Clearwell E-Discovery Platform: Search &Cull-Down, http://www.clearwellsystems.com/products/e-discovery-search-cull.php, Downloaded Feb. 20, 2008 1 page.

Dale, et al., "Programming and Problem Solving with C++," 2002, Jones and Bartlett Publishers, 3rd Edition, pp. 653-662.

Deitel, et al., "C++—How to Program," 2001, Prentice Hall, 3rd Edition, pp. 273-279.

Fast, Fast ESP Revitalizing your search experience with intelligent, user-centric search, 2007, Fast Search & Transfer ASA., 6 pages.

Google, Google Search Appliance, http://www.google.com/enterprise/gsa/, Downloaded, Feb. 20, 2008, 2 pages.

Guidance Software, EnCase® eDiscovery Suite, http://www.guidancesoftware.com/products/ediscovery_index.aspx, Downloaded Feb. 20, 2008, 2 pages.

Kaufman, et al., "Network Security-Private Communication in a Public World," 1995, Prentice, Hall PTR, p. 80.

Koch, et al., "Oracle8—The Complete Reference," 1997, Osborn McGraw-Hill, pp. 9-7 and 51-62.

Krishnaprasad, Muralidhar, et al, Oracle Searching Enterprise Applications (Siebel 7.8 and E-Business Suite 11i) with Oracle Secure Enterprise Search 10.1.8, An Oracle White Paper, Jan. 2007, 25 pages.

Oracle Secure Enterprise Search 10G, Mar. 2006, 8 pages.

Oracle8™ Tuning, Release 8.0, Dec. 1997, Oracle®.

PCT Search Report PCT /US03/30178 dated Mar. 11, 2004, 5 pages.

PCT Search Report PCT /US06/5317 dated Jul. 24, 2006, 5 pages.

Zantaz, Enterprise Archive Solution (EAS) Product family, Datasheet, 4 pages.

Office Action for U.S. Appl. No. 10/247,002 mailed Mar. 3, 2006.

Office Action for U.S. Appl. No. 10/247,002 mailed Aug. 21, 2006.

Office Action for U.S. Appl. No. 10/247,002 mailed Jan. 23, 2007.
Office Action for U.S. Appl. No. 10/247,002 mailed Sep. 17, 2007.
Office Action for U.S. Appl. No. 10/247,002 mailed Dec. 12, 2007.
Office Action for U.S. Appl. No. 10/247,002 mailed Jun. 18, 2008.
Office Action for U.S. Appl. No. 10/247,002 mailed Jan. 25, 2008.
Office Action for U.S. Appl. No. 10/431,145 mailed Oct. 23, 2006.
Office Action for U.S. Appl. No. 10/431,145 mailed Jul. 26, 2007.
Office Action for U.S. Appl. No. 10/431,145 mailed Feb. 25, 2008.
Notice of Allowance for U.S. Appl. No. 10/431,145 mailed Aug. 20, 2008.
Office Action for U.S. Appl. No. 10/607,718 mailed Feb. 10, 2006.
Office Action for U.S. Appl. No. 10/607,718 mailed Jun. 28, 2006.
Office Action for U.S. Appl. No. 10/607,718 mailed Nov. 15, 2006.
Office Action for U.S. Appl. No. 10/607,718 mailed Jul. 10, 2007.
Office Action for U.S. Appl. No. 10/607,718 mailed Jan. 8, 2008.
Office Action for U.S. Appl. No. 10/607,718 mailed Jul. 3, 2008.
Office Action for U.S. Appl. No. 10/833,538 mailed Oct. 31, 2006.
Office Action for U.S. Appl. No. 10/833,538 mailed Jul. 23, 2007.
Office Action for U.S. Appl. No. 10/833,538 mailed Feb. 14, 2008.
Notice of for U.S. Appl. No. 10/833,538 mailed Aug. 6, 2008.
Office Action for U.S. Appl. No. 10/892,982 mailed Jan. 23, 2007.
Office Action for U.S. Appl. No. 10/892,982 mailed Sep. 17, 2007.
Office Action for U.S. Appl. No. 10/892,982 mailed Apr. 8, 2008.
Office Action for U.S. Appl. No. 10/892,982 mailed Oct. 27, 2008.
Office Action for U.S. Appl. No. 10/892,615 mailed Apr. 27, 2007.
Office Action for U.S. Appl. No. 10/892,615 mailed Dec. 12, 2007.
Office Action for U.S. Appl. No. 10/892,615 mailed Apr. 21, 2008.
Office Action for U.S. Appl. No. 10/892,615 mailed Dec. 5, 2008.
Office Action for U.S. Appl. No. 11/057,988 mailed Aug. 18, 2008.
Office Action for U.S. Appl. No. 11/058,551 mailed Sep. 9, 2008.
GB0921722.5 Search Report dated Mar. 26, 2010, 1 page.
Office Action for U.S. Appl. No. 10/247,002 mailed May 21, 2009.
Office Action for U.S. Appl. No. 10/247,002 mailed Dec. 31, 2009.
Notice of Allowance for U.S. Appl. No. 10/431,145 mailed Jun. 5, 2009.
Office Action for U.S. Appl. No. 12/490,258 mailed Mar. 31, 2011.
Office Action for U.S. Appl. No. 10/607,718 mailed Nov. 14, 2008.
Office Action for U.S. Appl. No. 10/607,718 mailed May 1, 2009.
Office Action for U.S. Appl. No. 10/607,718 mailed Nov. 9, 2009.
Office Action for U.S. Appl. No. 10/607,718 mailed Apr. 12, 2010.
Office Action for U.S. Appl. No. 10/607,718 mailed Aug. 17, 2010.
Office Action for U.S. Appl. No. 10/607,718 mailed Feb. 3, 2011.
Notice of Allowance for U.S. Appl. No. 12/266,545 mailed Mar. 25, 2011.
Office Action for U.S. Appl. No. 10/892,982 mailed Feb. 12, 2009.
Office Action for U.S. Appl. No. 10/892,982 mailed Jul. 20, 2009.
Office Action for U.S. Appl. No. 10/892,982 mailed Jan. 6, 2010.
Office Action for U.S. Appl. No. 10/892,615 mailed May 12, 2009.
Office Action for U.S. Appl. No. 10/892,615 mailed Mar. 24, 2010.
Advisory Action for U.S. Appl. No. 10/892,615 mailed Jul. 2, 2010.
Office Action for U.S. Appl. No. 11/057,988 mailed Jan. 28, 2009.
Office Action for U.S. Appl. No. 11/057,988 mailed Jul. 10, 2009.
Office Action for U.S. Appl. No. 11/057,988 mailed Mar. 18, 2010.
Office Action for U.S. Appl. No. 11/058,551 mailed Mar. 20, 2009.
Office Action for U.S. Appl. No. 11/058,551 mailed Sep. 11, 2009.
Office Action for U.S. Appl. No. 11/058,551 mailed Mar. 8, 2010.
Office Action for U.S. Appl. No. 11/058,551 mailed Aug. 2, 2010.
Office Action for U.S. Appl. No. 11/058,551 mailed Apr. 11, 2011.
Office Action for U.S. Appl. No. 12/179,630 mailed Aug. 31, 2010.
Notice of Allowance Action for U.S. Appl. No. 12/179,630 mailed Mar. 24, 2011.
Office Action for U.S. Appl. No. 12/079,660 mailed Dec. 22, 2010.

* cited by examiner

DETECTING POLICY VIOLATIONS IN INFORMATION CONTENT CONTAINING DATA IN A CHARACTER-BASED LANGUAGE

FIELD OF INVENTION

Embodiments of the invention relate to the field of processing data, and more particularly, to detecting policy violations in information content containing data in a character-based language.

BACKGROUND OF THE INVENTION

A modern organization typically maintains a data storage system to store and deliver records concerning various significant business aspects of the organization. Stored records may include data on customers (or patients), contracts, deliveries, supplies, employees, manufacturing, or the like. A data storage system of an organization usually utilizes a tabular storage mechanism, such as relational databases, client/server applications built on top of relational databases (e.g., Siebel, SAP, or the like), object-oriented databases, object-relational databases, document stores and file systems that store table formatted data (e.g., CSV files or Excel spreadsheet files), password systems, single-sign-on systems, or the like.

Tabular data stores are typically hosted by a computer connected to a local area network (LAN). This computer is usually made accessible to the Internet via a firewall, router, or other packet switching devices. Although the accessibility of a tabular data store via the network provides for more efficient utilization of information maintained by the tabular data store, it also poses security problems due to the highly sensitive nature of this information. In particular, because access to the tabular data store is essential to the job function of many employees in the organization, there are many possible points of potential theft or accidental distribution of this information. Theft of information represents a significant business risk both in terms of the value of the intellectual property as well as the legal liabilities related to regulatory compliance.

Existing security techniques typically monitor messages sent by employees of an organization to outside recipients to prevent loss of sensitive information. In particular, existing security techniques usually separate a message into tokens and determine whether any subset of these tokens contains sensitive information. The tokenization process works well with word-based natural languages that provide visible delimiters (e.g., spaces and punctuation marks) between words. Word-based languages include languages utilizing the Roman alphabet (e.g., English, French, etc.), the Arabic alphabet (e.g., Arabic, Persian, etc.), the Cyrillic alphabet (e.g., Russian, Serbian, Bulgarian, etc.), etc. Character-based languages, however, do not provide visual delimiters between words. For example, Chinese and Japanese do not visually separate words. Rather, the reader is required to understand from the context where in a string of characters one word ends and the next word begins. In addition, character-based languages typically include thousands of characters and require support for multiple alphabets.

Current mechanisms for tokenizing content in character-based languages usually rely on dictionaries containing lists of known words in specific character-based languages. However, this approach is ineffective with names because each name in a character-based language such as Japanese or Chinese can be represented by any random combination of characters. Confidential information typically includes the name of an individual and his or her data identifier such as the social security number, credit card number, employee number, etc. Hence, there is a need for an efficient mechanism to protect confidential information that includes data in a character-based language.

SUMMARY OF THE INVENTION

A method and apparatus for detecting policy violations in information content containing data in a character-based language is described. In one embodiment, the method includes identifying a policy for protecting source data having a tabular format. The source data contains one or more data fragments in the character-based language. The method further includes receiving information content having at least a portion in the character-based language, and determining whether any part of the information content, including the portion in the character-based language, violates the policy.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
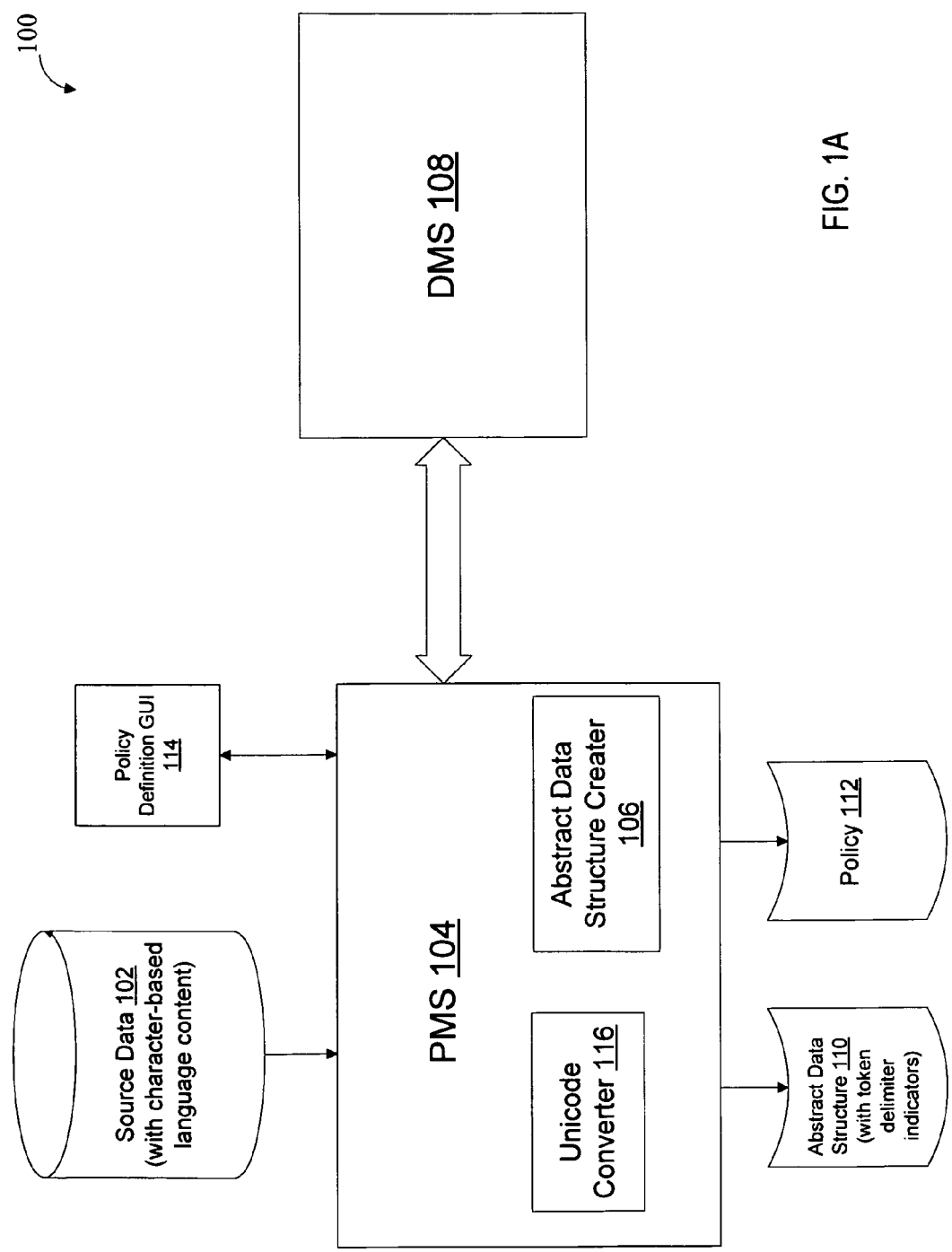
FIG. 1A illustrates one embodiment of exemplary system architecture for providing data loss protection with support for character-based languages.

A system and method for detecting policy violations in information content containing data in a character-based language is described. A policy specifies source data that should be protected from unauthorized use due to its sensitive or confidential nature. The source data may be stored in a tabular format or be convertible to a tabular format. In one embodiment, the system for detecting policy violations includes a policy management component that defines a policy for protecting source data, and a data monitoring component that monitors information content to detect policy violations. Information content may include transmitted messages (e.g., email messages, web mail messages, etc.) or data stored in databases, caches, etc. The system for detecting policy violations provides support for character-based languages such as Japanese and Chinese. That is, the policy management component may define a policy to protect source data that includes data fragments in a character-based language, and the data monitoring component may monitor information content that includes at least a portion in the character-based language to determine whether the information content, including the portion in the character-based language, violates the policy protecting the source data.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1A is a block diagram of exemplary system architecture 100 for providing data loss protection with support for character-based languages. The system 100 includes a policy management system (PMS) 104 and a data monitoring system (DMS) 108. The PMS 104 and the DMS 108 may be coupled to a computer network that communicates any of the standard protocols for the exchange of information. They may run on one Local Area Network (LAN) and may be incorporated into the same physical or logical system, or different physical or logical systems. Alternatively, the PMS 104 and DMS 108 may reside on different LANs that may be coupled together via the Internet but separated by firewalls, routers, and/or other network devices. In yet another configuration, the PMS 104 may reside on a server, and the DMS 108 may reside on a client to detect policy violations in information content stored on the client, which may be coupled to the server via a public network (e.g., the Internet) or a private network (e.g., LAN). It should be noted that various other network configurations can be used including, for example, hosted configurations, distributed configurations, centralized configurations, etc.

The PMS 104 is responsible for receiving parameters pertaining to policies, such as pre-configured template policies or customized policies, and creating policies based on these parameters. In one embodiment, the PMS 104 receives the policy parameters via the policy definition graphical user interface (GUI) 114. In another embodiment, the PMS 104 receives the policy parameters from an Application Programming Interface (API) or via a configuration file formatted in text or a defined data format (e.g., extensible markup language (XML) or binary format).

The PMS 104 may create policies 112 based on regulations concerning handling of sensitive information maintained by an organization, or based on corporate data governance rules. The regulations may include, for example, the Health Insurance Portability and Accountability Act (HIPAA) ensuring the confidentiality of electronic protected health information, California Senate Bill 1 (SB1) or Senate Bill 1386 (SB1386) controlling customer information leaving the company and affiliates, the Gramm-Leach-Bliley Financial Services Modernization Act controlling customer information leaving a financial institution, the Cardholder Information Security Program (CISP) controlling handling of customer credit card information maintained by an organization, or the like. In one embodiment, the PMS 104 may use policy templates or customized policies pre-configured based on input provided by individuals familiar with the relevant regulations or corporate data governance rules.

The policy 112 may include a set of rules that specify which information should be present in a message to trigger a violation. The term "message" as used herein is referred to any content being scanned for policy violations. For example, a message may represent a transmitted document (e.g., an email message, a web mail message, etc.) or data stored in databases, caches, etc. The set of rules may provide specific conditions for triggering a violation (e.g., a sender or recipient of a message, inclusion in a message of a keyword(s) or regular expression pattern, etc.). The rules in the policy may be combined using logical connectives of first-order logic (e.g., AND, OR, NAND, NOR, NOT, equivalent, nonequivalent, or the like).

The policy 112 specifies source data 102 that should be protected from unauthorized transmission, access or any other use. The source data 102 may be stored in a tabular format (e.g., data in a relational database, data maintained by client/server applications built on top of relational databases, data in document and file systems that store table formatted data (e.g., CSV files or Excel spreadsheet files), etc.) or it may be stored in a non-tabular format but convertible to a tabular format (e.g., data stored as comma separated values in a flat file, a password database or a single-sign-on system, relational data in an object-oriented database, etc.). The policy 112 may also specify which portions of the source data 102 should be included in a message to trigger a policy violation.

In one embodiment, the PMS 104 extracts copies of the source data 102 and derives from that data an abstract data structure 110 as will be discussed in more detail. The abstract data structure 110 may be created periodically and sent to the DMS 108, along with the policy 112 that is to be implemented.

The DMS 108 is responsible for monitoring information content (e.g., email messages and/or other documents according to the configuration of the DMS 108) based on the abstract data structure 110 and policies 112 to detect policy violation incidents. Once the DMS 108 has detected a policy violation, the DMS 108 reports the policy violation to an appropriate entity (e.g., a manager, database administrator, a reporting system, etc.) or performs some other action.

Figure 1B:
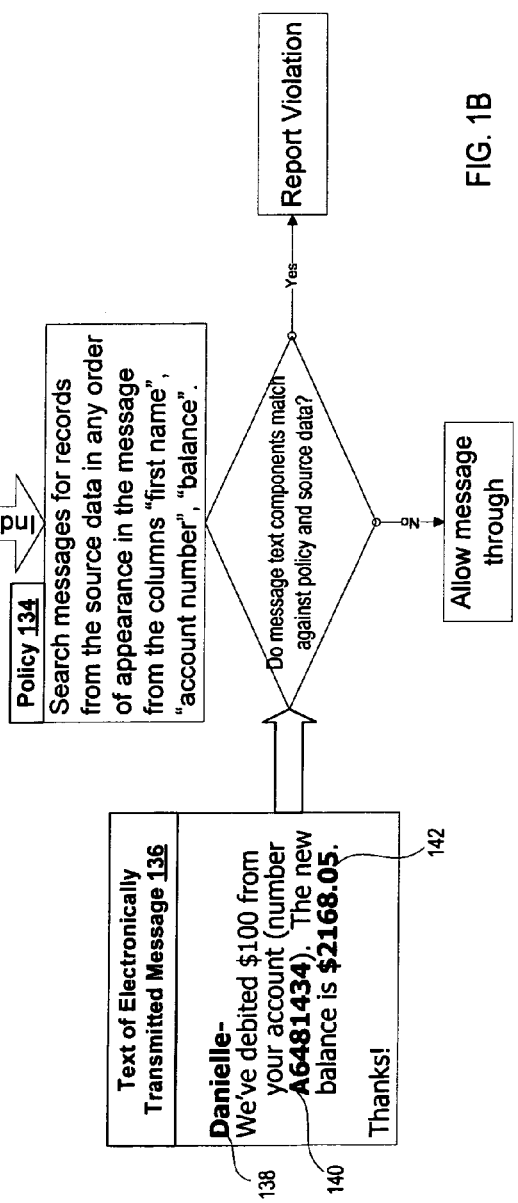
FIG. 1B illustrates a mechanism of handling an email message based on a specific policy.

An exemplary operation of the PMS 104 and the DMS 108 will now be discussed in more detail with reference to FIG. 1B. In particular, FIG. 1B shows a portion of source data 130, including a set of columns and several rows. As shown, the source data 130 is indexed to derive an abstract data structure. A policy 134 specifies that messages should be searched for data from the columns "First Name," "Account Number," and "Balance" in individual records from the source data 130 in any order of appearance in the message. A message 136 is searched for policy violations using the abstract data structure of the source data 130 and the policy 134. As shown, the message 136 includes data from the last row 132 of the source data 130. In particular, the message 136 includes data fragments 138, 140 and 142 from restricted columns of the data source 130 as specified in the policy 134. Accordingly, the message 136 violates the policy 134 and needs to be reported to an appropriate entity.

Returning to FIG. 1A, the DMS 108 detects policy violations in messages, irrespective of the natural language of the source data 102 and a message. For example, the DMS 108 can search messages for confidential information in any word-based language (e.g., English, Hebrew, Russian, etc.) or any character-based language (e.g., Chinese, Japanese, etc.). In one embodiment, the DMS 108 uses a search mechanism that first divides a message into tokens and then determines whether any subset of the tokens contains data fragments from the source data 102. For word-based natural languages, tokenization of a message is performed based on apparent delimiters between words such as spaces and punctuation marks. However, character-based languages do not provide any identifiable delimiters. In one embodiment, the DMS 108 solves this problem by utilizing token delimiter indicators contained in the abstract data structure 110, which will now be discussed in more detail.

In one embodiment, the PMS 104 includes a Unicode converter 116 and an abstract data structure creator 106. The Unicode converter 116 is responsible for converting character encodings of the source data into Unicode. Unicode allows representing international characters using a single character set. By converting the character encodings into Unicode, potential similarities between different language encodings are avoided, maintaining the accuracy across international languages.

The abstract data structure creator 106 is responsible for creating an index of the source data 102 in the form of the abstract data structure 110, as will be discussed in more detail below in conjunction with FIG. 3. In addition, the abstract data structure creator 106 adds to the abstract data structure 110 a token delimiter indicator for each data fragment in a character-based language. Because the source data 102 has a tabular format, the abstract data structure creator 106 considers data from an individual cell in the source data 102 as a token. In one embodiment, the abstract data structure creator 106 creates a token delimiter indicator for a token by combining a value of a first character of the token and the length of the token.

When the DMS 108 determines that a message being examined includes at least a portion in a character-based language, the DMS 108 uses the token delimiter indicators to guide the identification of potential tokens within the message. Exemplary embodiments of tokenizing content in a character based language in the context of source data protection will be discussed in more detail below.

Figure 2:
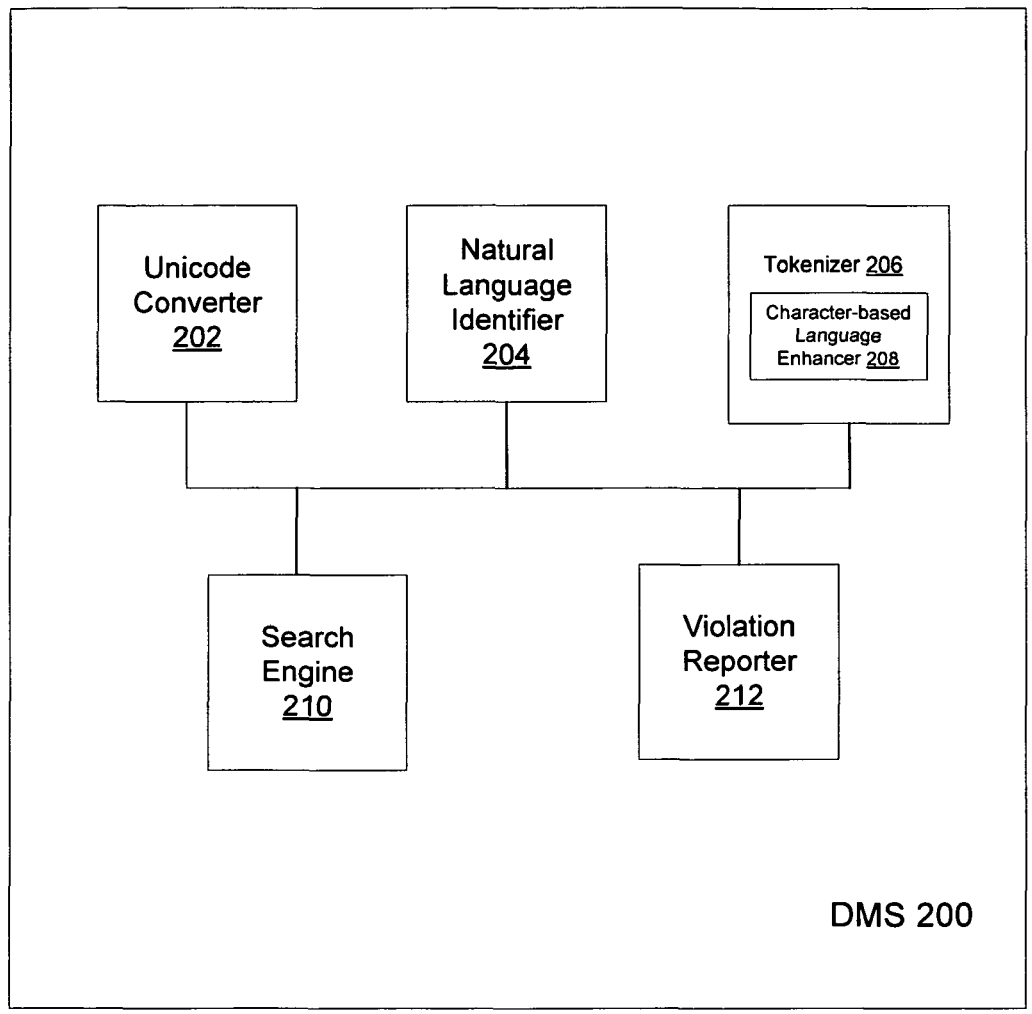
FIG. 2 is a block diagram of one embodiment of a data management system (DMS).

FIG. 2 is a block diagram of one embodiment of a data monitoring system (DMS) 200. The DMS 200 may include a Unicode converter 202, a natural language identifier 204, a tokenizer 206, a search engine 210, and a violation reporter 212.

The Unicode converter 202 is responsible for receiving information content (e.g., an email message) and converting character encodings of the information content into Unicode to avoid potential similarities between different language encodings. The natural language identifier 204 is responsible for analyzing the information content for languages and splitting the information content into single language sections.

The tokenizer 206 is responsible for creating tokens from the information content. Sections of the information content in a word-based language are tokenized based on apparent word boundaries (e.g., spaces and punctuation marks). For a character-based language, the tokenizer 206 invokes the character-based language enhancer 208 that creates tokens based on token delimiter indicators from the abstract data structure, as will be discussed in more detail below in conjunction with FIGS. 4, 5A and 5B.

The search engine 210 is responsible for searching the resulting tokens for data fragments from the source data based on the specific policy. Exemplary search techniques will be discussed in more detail below in conjunction with FIGS. 6A, 6B and 6C. The violation reporter 212 is responsible for notifying an appropriate entity of a detected violation (e.g., via a user interface, an email message, etc.).

Figure 3:
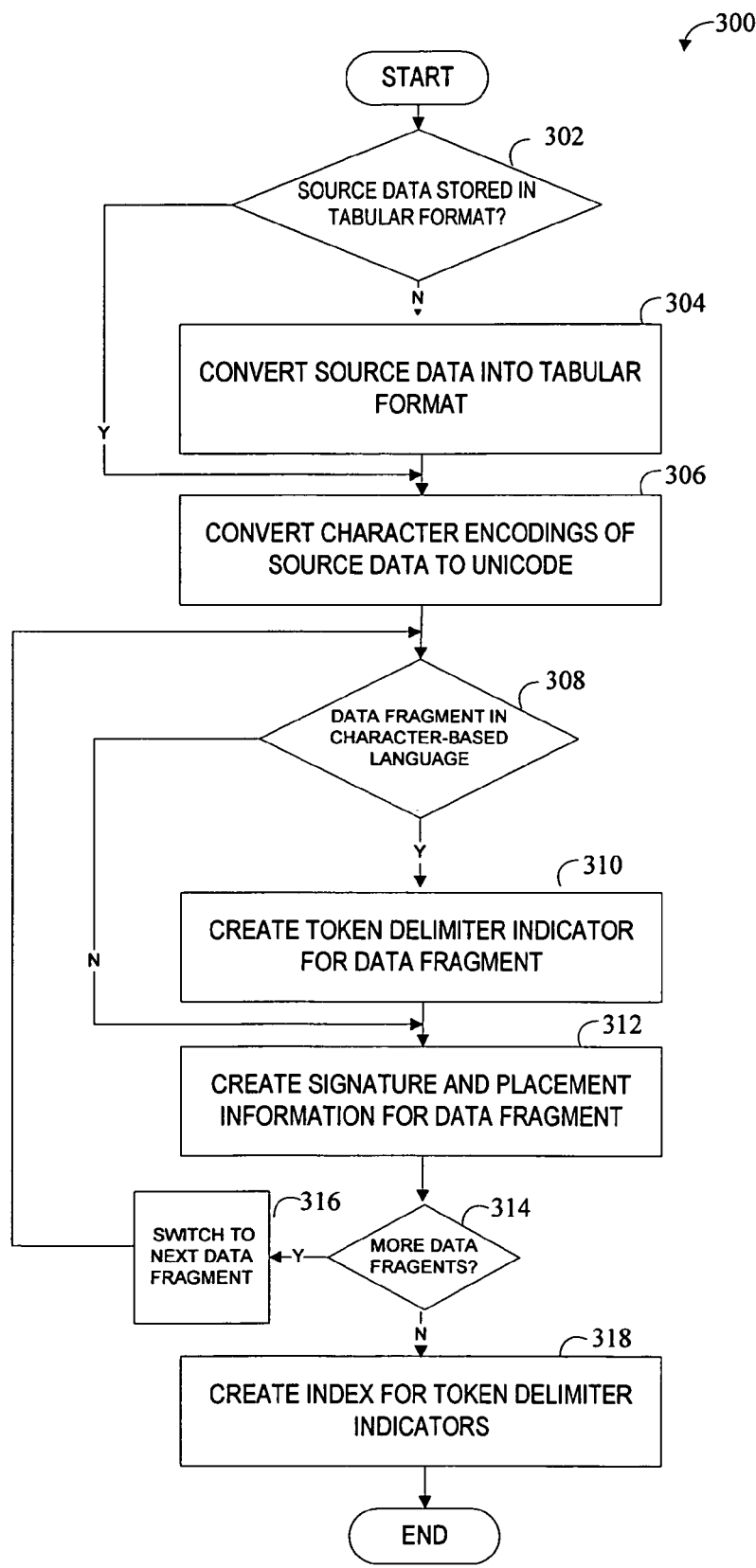
FIG. 3 is a flow diagram of one embodiment of a method for creating an abstract data structure from source data.

FIG. 3 is a flow diagram of one embodiment of a method 300 for creating an abstract data structure. The method 300 is performed by processing logic that may comprise hardware (circuitry, dedicated logic, etc.), software (such as is run on a general purpose computer system or a dedicated machine), or a combination of both. In one embodiment, the method 300 is performed by a policy management component (e.g., PMS 104 of FIG. 1).

Referring to FIG. 3, processing logic begins with determining whether the source data is stored in a standard tabular format (block 302). If not, processing logic converts the source data into a standard tabular format (block 304). Each cell in the resulting table stores a fragment of the source data. This data fragment represents a token, regardless of the natural language of the data fragment. A token may be a single word or a cluster of words (e.g., words enclosed in quotation marks). For example, while the word "this" may represent a token stored in a database cell, the phrase "this token" may also represent a standalone token if it is stored as a single string in a database cell.

At block 306, processing logic converts character encodings of data fragments to Unicode. In one embodiment, processing logic first determines which language encoding scheme is used for a relevant data fragment. This determination can be made based on an encoding scheme indicator stored with the data fragment. If such an indicator is not present, processing logic may use standard libraries (e.g., International Components for Unicode (ICU) libraries) to obtain a likely encoding scheme.

Next, processing logic accesses the first data fragment from the source data and determines whether, this data fragment is in a character-based language (block 308). If not, processing logic proceeds to block 312. If so, processing logic creates a token delimiter indicator for this data fragment (block 310) and then proceeds to block 312. In one embodiment, the token delimiter indicator includes the value of a first character of the data fragment and the length of the data fragment. Such a token delimiter indicator includes generalized data that would not allow a malicious user to recover the content of the original data fragment.

At block 312, processing logic creates a signature and placement information for the current data fragment. The signature may include an encrypted or hashed copy of the data fragment or some other representation of the data fragment that would not allow a malicious user to recover the actual content of the data fragment. The placement information may include the number of a row storing the data fragment in the source data and/or the number of a column storing the data fragment in the source data. Optionally, the placement information may also include the data type of the column.

In one embodiment, the data created at blocks 310 and 312 may be stored in a tuple-storage structure derived from the source data. A tuple-storage structure provides a mechanism for storing multiple tuples associated with the fragments of the source data. Examples of tuple-storage structures include a hash table, a vector, an array, a tree or a list. Each type of the tuple-storage structure is associated with a method for retrieving a set of tuples for any given content fragment (the set of tuples may be empty if no match is found in the tuple-storage structure). The data created at blocks 310 and 312 may be stored in a tuple corresponding to the data fragment being currently processed.

At block 314, processing logic determines whether the source data includes more data fragments that have not yet been processed. If so, processing logic switches to the next data fragment (block 316) and returns to block 308. If all data fragments have been processed, processing logic creates an index from the resulting token delimiter indicators, using the value of the first character as the key.

In one embodiment, in which the abstract adapt structure is created as a tuple storage structure, processing logic may sort the tuples in a predetermined order (e.g., in the ascending lexicographic order). In one embodiment, the contents of the abstract data structure are treated cryptographically (e.g., with a hash function or using an encryption function with a cryptographic key) to further secure the abstract data structure from theft.

Figure 4:
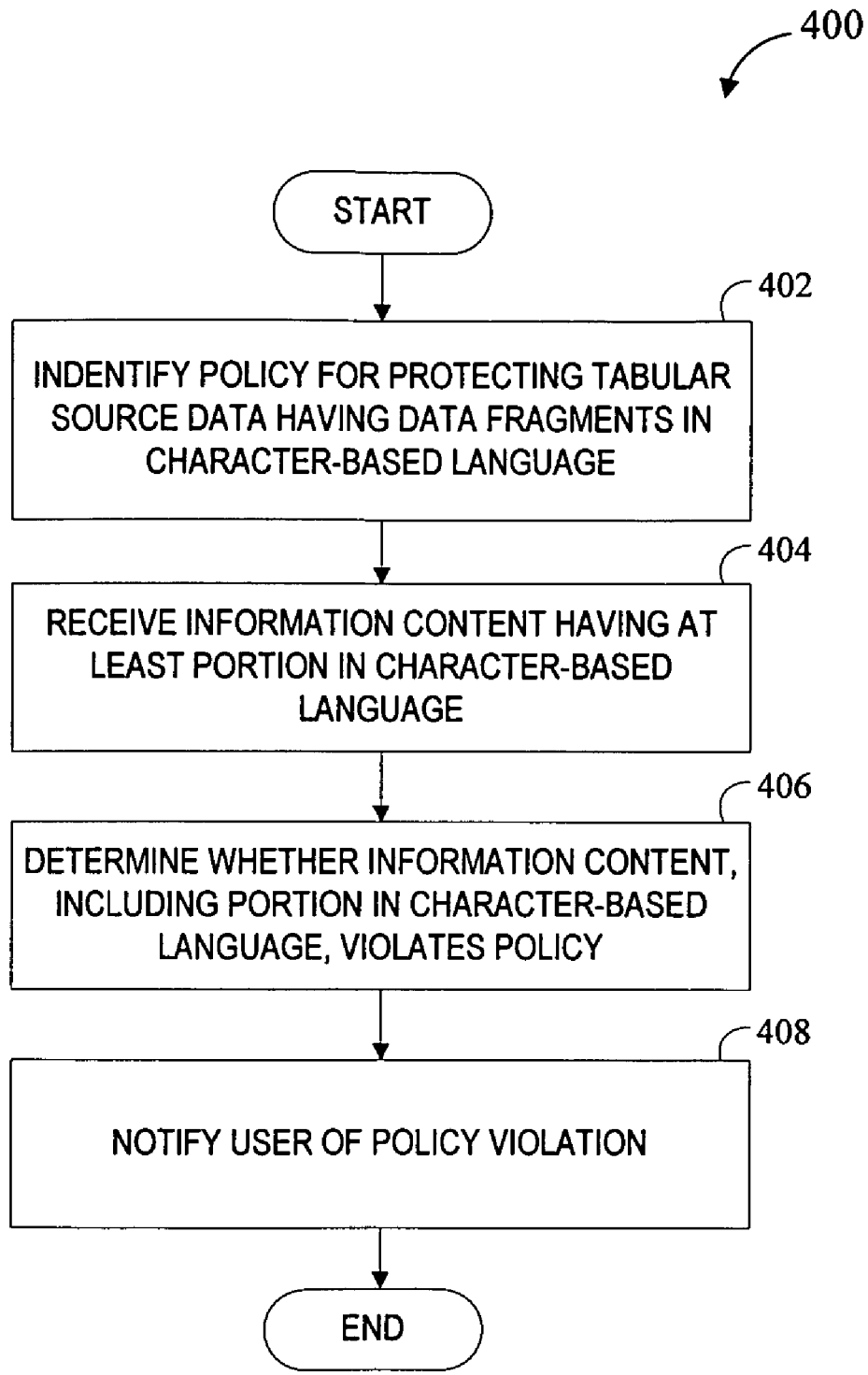
FIG. 4 is a flow diagram of one embodiment of a policy violation detection method supporting character-based languages.

FIG. 4 is a flow diagram of one embodiment of a policy violation detection method 400 that provides support for character-based languages. The method 400 is performed by processing logic that may comprise hardware (circuitry, dedicated logic, etc.), software (such as is run on a general purpose computer system or a dedicated machine), or a combination of both. In one embodiment, the method 400 is performed by a data monitoring component (e.g., DMS 108 of FIG. 1).

Referring to FIG. 4, processing logic begins with identifying a policy for protecting tabular source data having data fragments in a character-based language (block 402). The policy may specify the source data and include one or more rules (e.g., rules concerning data loss prevention) for triggering a violation.

At block 404, processing logic receives information content that contains at least a portion in a character-based language (e.g., Japanese or Chinese). The information content may include free-from text and may be a file (e.g., an archived email message stored on a hard drive of a computer) or a block of data transmitted over a network (e.g., an email message transmitted over a network using any type of a network protocol).

At block 406, processing logic determines whether the information content, including the portion in the character-based language, violates the policy for protecting the source data. If a policy violation is detected, processing logic notifies an appropriate entity of the detected policy violation (block 408).

Accordingly, method 400 allows sensitive information to be protected from unauthorized use (e.g., transmission, access, etc.) irrespective of the natural language of the sensitive information, as well as the natural language of the content being monitored for presence of sensitive information.

Figure 5A:
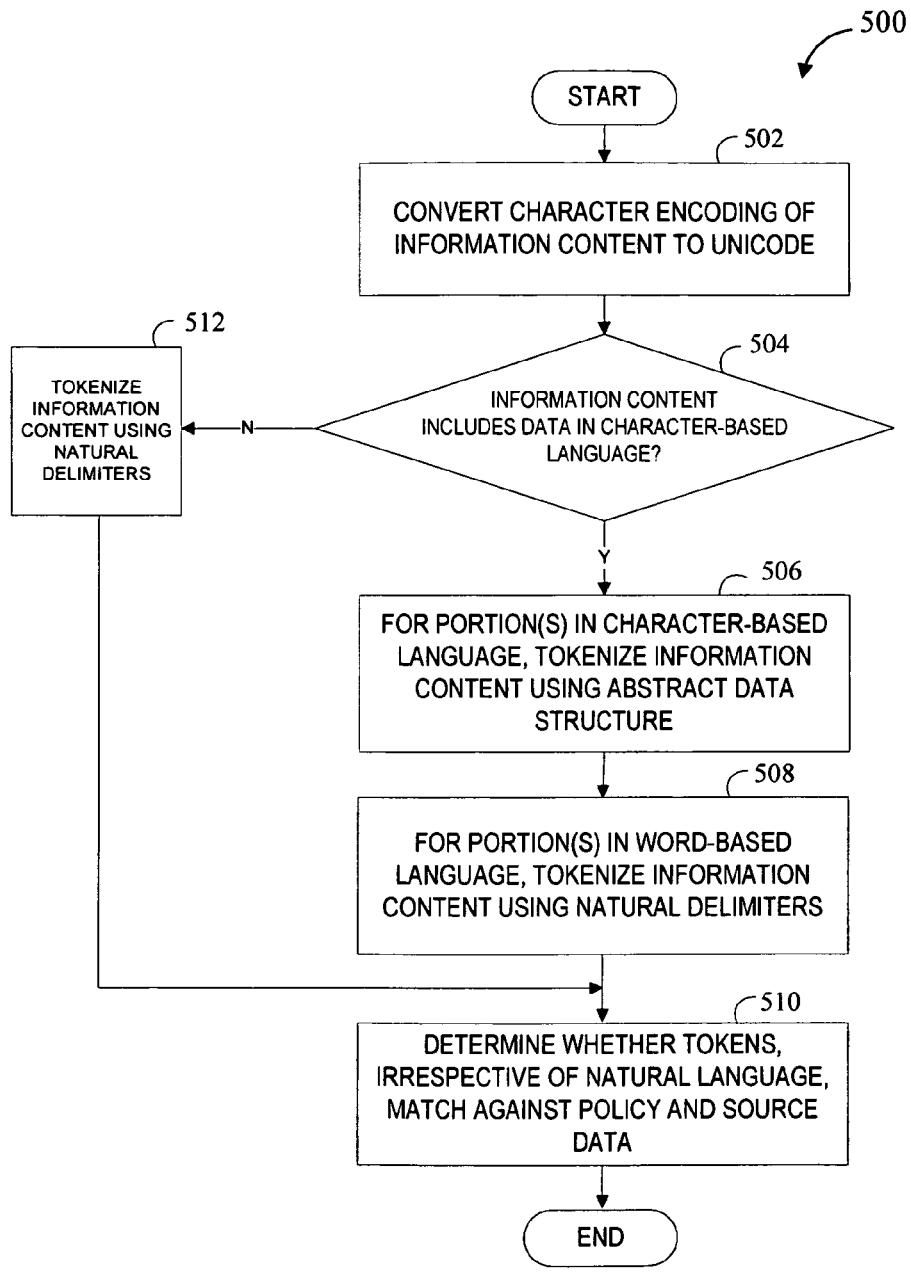
FIGS. 5A and 5B are flow diagrams of some embodiments of a method for utilizing an abstract data structure to provide support for character-based languages.
Figure 5B:
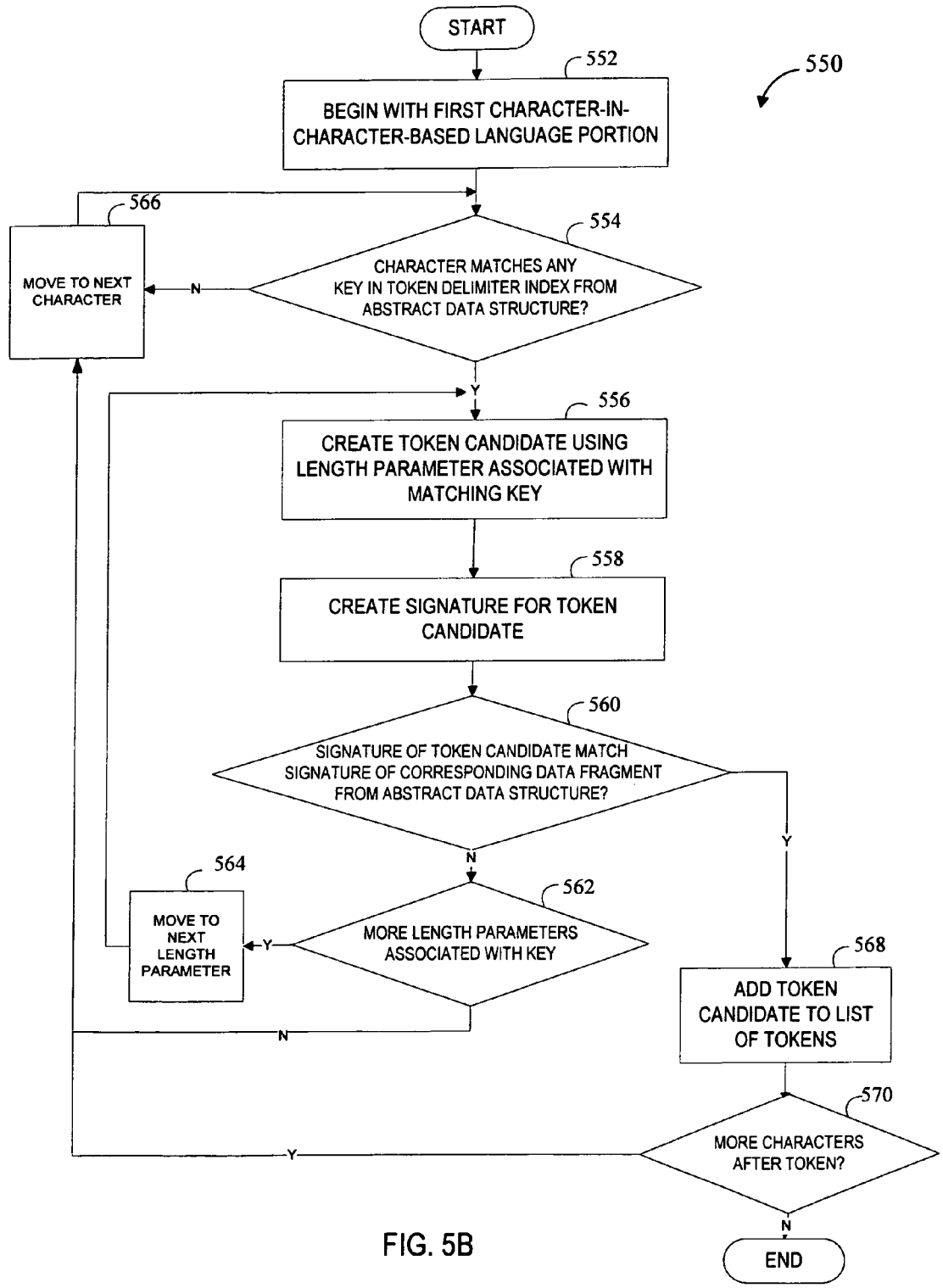

FIGS. 5A and 5B are flow diagrams of some embodiments of a method for utilizing an abstract data structure to provide support for character-based languages. The method 500 is performed by processing logic that may comprise hardware (circuitry, dedicated logic, etc.), software (such as is run on a general purpose computer system or a dedicated machine), or a combination of both. In one embodiment, the method is performed by a data monitoring component (e.g., DMS 108 of FIG. 1).

Referring to FIG. 5A, method 500 begins with processing logic converting character encodings of information content to Unicode (block 502). In one embodiment, processing logic first determines which language encoding scheme is used for the information content. This determination can be made based on an encoding scheme indicator stored with the information content (e.g., in the header of the email message). If such an indicator is not present, processing logic may use standard libraries (e.g., ICU libraries) to obtain a likely encoding scheme.

At block 504, processing logic determines whether the information content includes data in a character-based language. If not, processing logic tokenizes the information content using apparent delimiters (block 512) and proceeds to block 512. If so, processing logic handles a portion(s) in the character-based language differently from a portion(s) (if any) in a word-based language. In particular, for each portion in the character-based language, processing logic creates tokens using an abstract data structure derived from the source data (block 506). In particular, processing logic utilizes token delimiter indicators contained in the abstract data structure derived from the source data. One embodiment of a method for tokenizing portions in a character-based language will be discussed in more detail below in conjunction with FIG. 5B. For each portion in a word-based language, processing logic tokenizes the relevant portion based on visible delimiters (block 508).

At block 510, processing logic determines whether the resulting tokens, irrespective of the natural language, contain data fragments from the source data as required by an applicable policy to trigger a violation. This determination can be made using a variety of search techniques, including search techniques discussed in more detail below in conjunction with FIGS. 6A-6C.

Referring to FIG. 5B, method 550 begins with processing logic identifying a first character in the character-based language portion of the information content such as a message (block 502). Next, processing logic accesses an index of token delimiter indicators in the abstract data structure. As discussed above, a token delimiter indicator includes a value of a first character of a corresponding data fragment in the character-based language in the source data, and the length of the corresponding data fragments. The resulting collection of token delimiter indicators is indexed using the value of a first character as the key. Hence, each key may be associated with several data fragments, depending on how many data fragments start with the same character.

At block 554, processing logic determines whether the first character in the character-based portion of the message matches any key in the token delimiter index. If not, processing logic moves to the next character (block 566) and returns to block 554. If so, processing logic creates a token candidate using the first length parameter associated with the matching key (block 556) and creates a signature of the token candidate using the same signature creation technique that was used for generating signatures for the abstract data structure (block 558).

If the signature of the token candidate from the message matches a signature of a corresponding data fragment from the abstract data structure (block 560), processing logic adds this token candidates to a list of tokens created for the message (block 568) and proceeds to a character at the end of the current token (block 566) if there are any characters that have not been processed in the character-based language portion of the message (block 570).

If the signature of the token candidate from the message does not match a signature of a corresponding data fragment from the abstract data structure, processing logic determines whether the current key corresponds to any other data fragments from the source data (block 562). An additional data fragment that corresponds to the current key may have the same or different length parameter. If the length parameter is the same, processing logic returns to block 560. If the length parameter is different, processing logic moves to the next length parameter (block 564) and then returns to block 556.

Accordingly, method 550 tokenizes the character-based language portion of the message by creating only those tokens that match data fragments from the source data, i.e., the tokens that can possible violate the policy. By ignoring the rest of the character-based language portion of the message, the subsequent search of the message for presence of the source data is simplified.

Figure 6A:
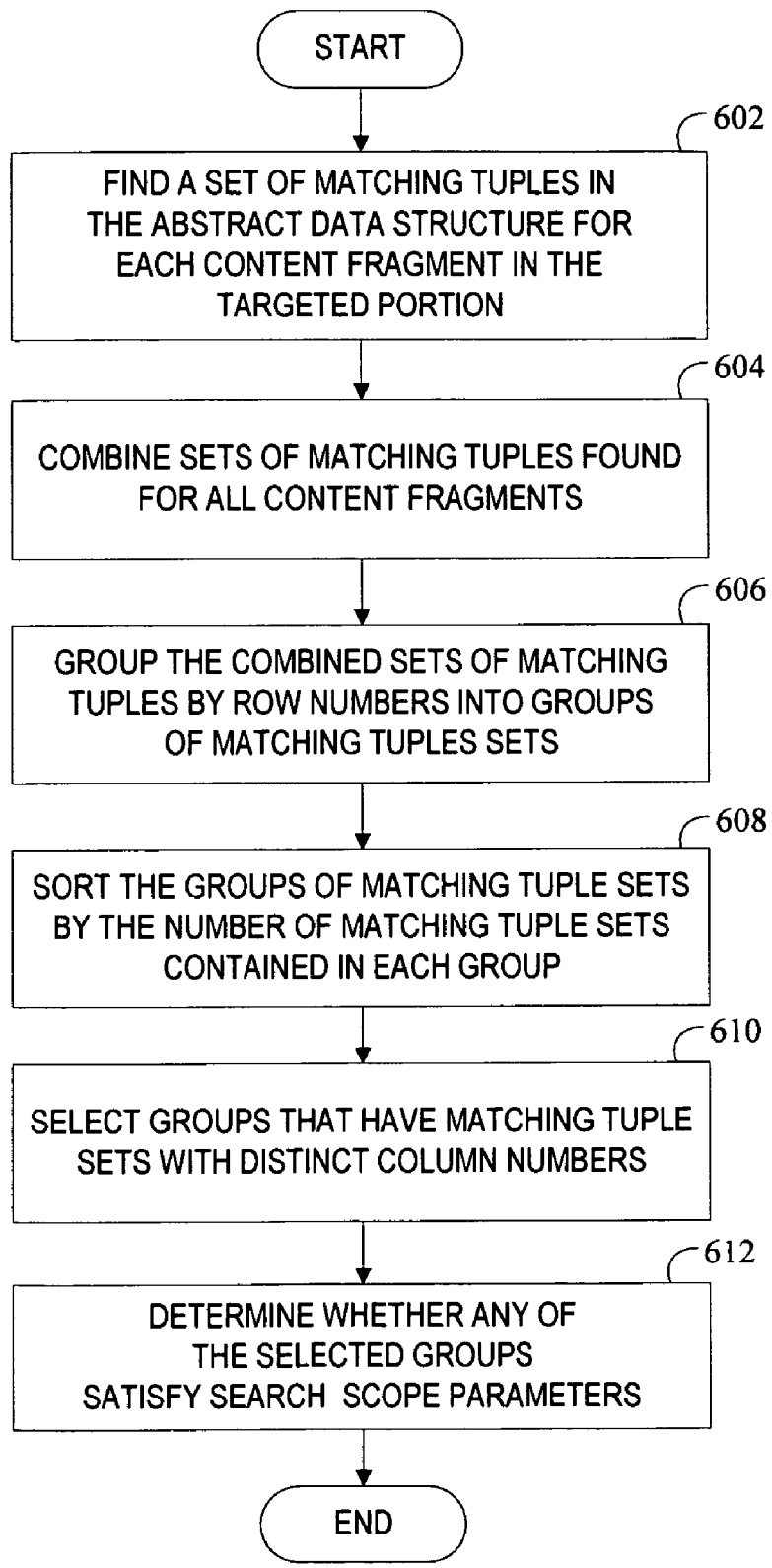
FIGS. 6A, 6B and 6C are flow diagrams of some embodiments of a method for finding a match for a subset of tokens in an abstract data structure derived from source data.
Figure 6B:
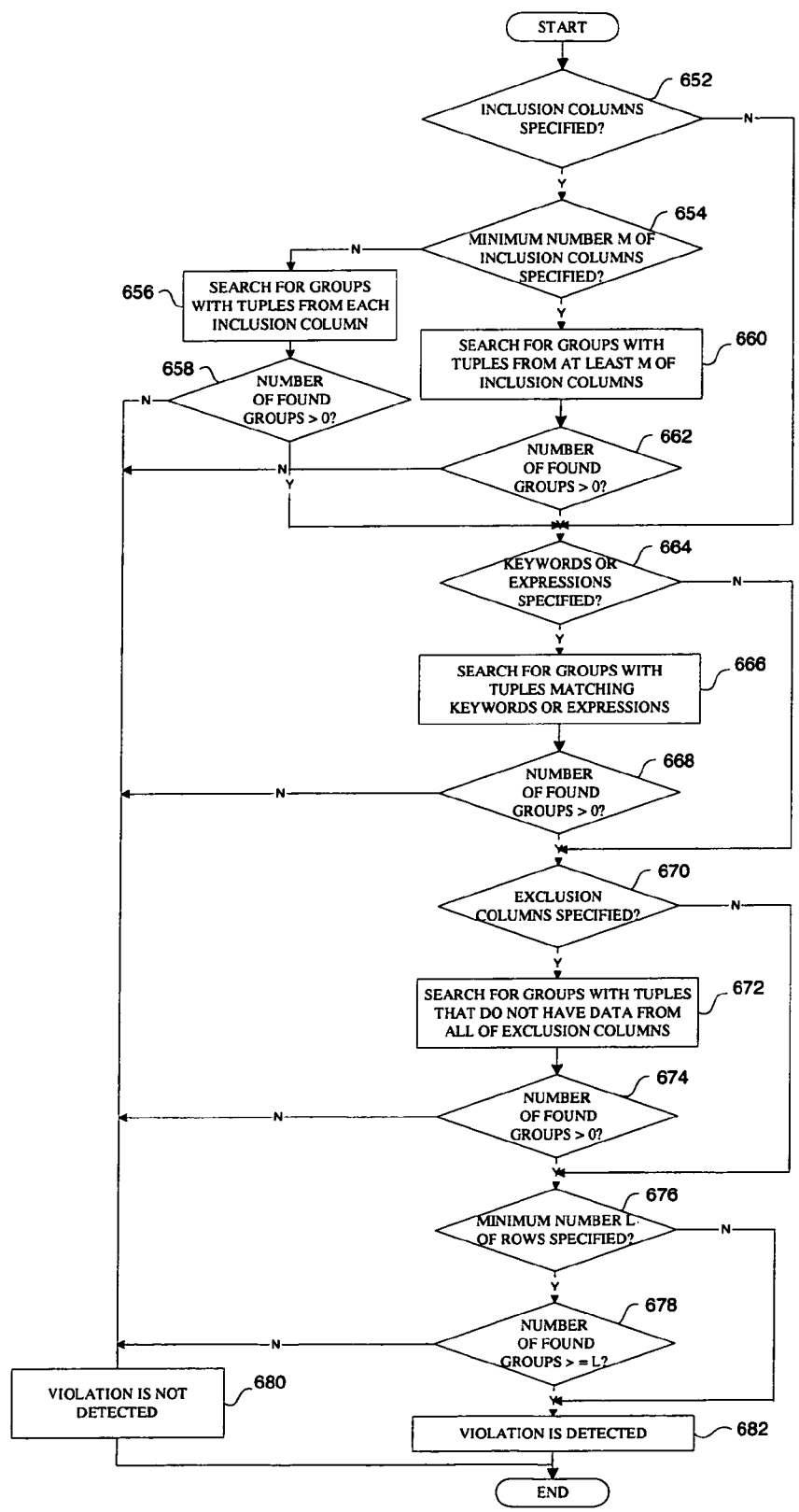
Figure 6C:
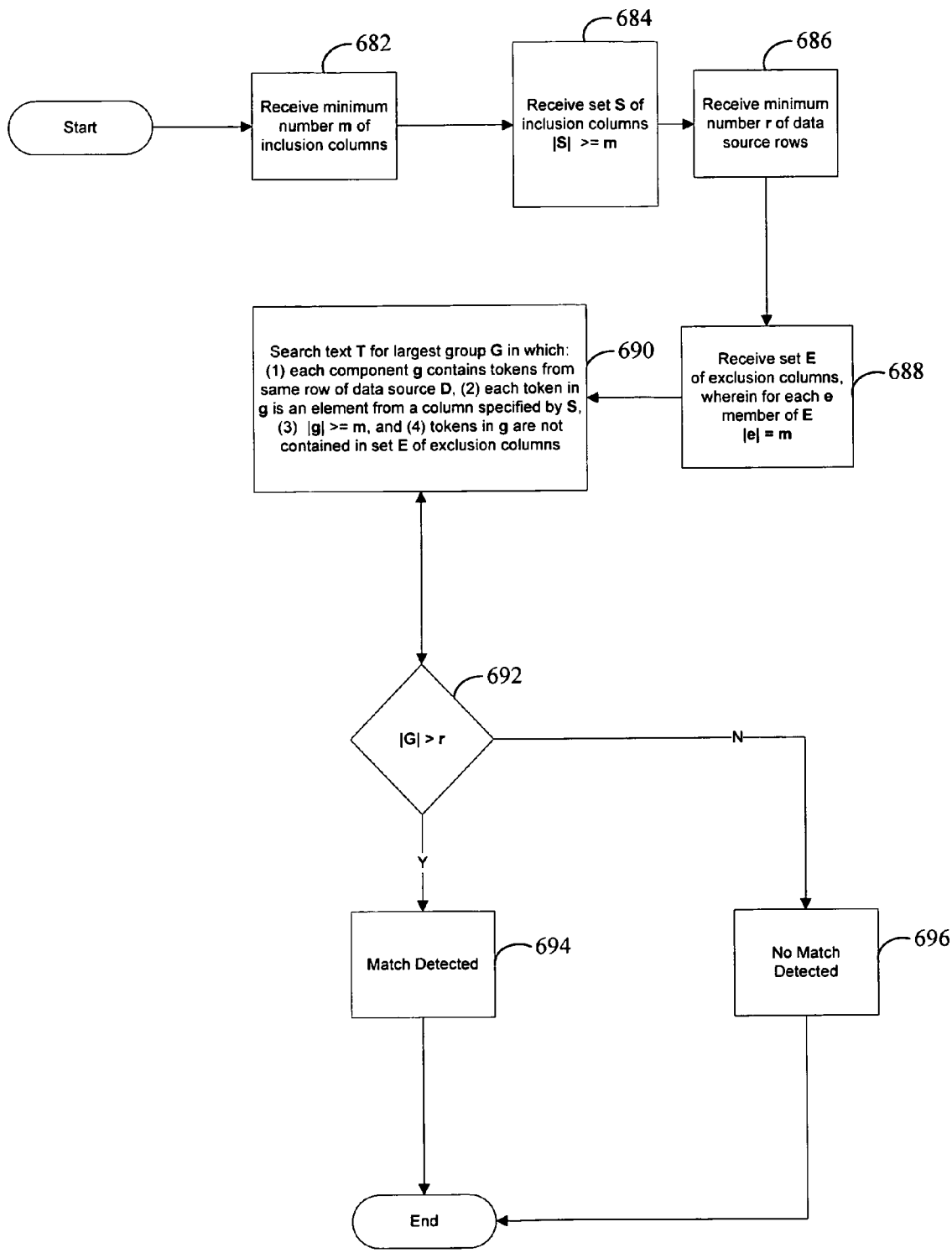

Exemplary search techniques will now be described in more detail. FIGS. 6A-6C are flow diagrams of various exemplary embodiments of a method to find in a subset of tokens a match satisfying policy parameters in an abstract data structure derived from source data. The method is performed by processing logic that may comprise hardware (circuitry, dedicated logic, etc.), software (such as is run on a general purpose computer system or a dedicated machine), or a combination of both. In one embodiment, the method is performed by a data monitoring component (e.g., DMS 108 of FIG. 1).

Referring to FIG. 6A, processing logic begins with searching, for each token or content fragment, the abstract data structure for a set of matching tuples (block 602). For example, a word "Smith" contained in the information content may have several occurrences in the source data that are reflected in the abstract data structure. Specifically, each of these occurrences has a corresponding tuple in the abstract data structure. During the search, processing logic retrieves a set of tuples corresponding to the occurrences of the word "Smith" in the source data. Each tuple stores information about the position of this data fragment within a database or a table storing the source data. In one embodiment, the positional information includes the row number of a cell storing the data fragment. In another embodiment, the positional information also includes a column number of this cell and optionally the data type of the column.

Next, processing logic combines the matching tuple sets found for all the content fragments (block 604) and then groups the combined matching tuple sets by row numbers into groups L (block 606). As a result, each group L (referred to herein as an accumulator) contains matching tuple sets that all have the same column number, i.e., the matching tuple sets in each group L correspond to fragments of the source data that all appear to be from the same row in the database.

Further, processing logic sorts the groups L by the number of matching tuple sets contained in each group (block 608) and, in one embodiment, selects those groups that have tuple sets with distinct column numbers (block 610). Afterwards, processing logic determines whether any of the selected groups satisfy policy parameters (block 612).

FIG. 6B illustrates one exemplary embodiment of a method for determining whether any selected groups of tuple sets satisfy policy parameters.

Referring to FIG. 6B, processing logic begins with determining whether the policy parameters specify inclusion columns (block 652). If not, processing logic proceeds to block 664. If so, processing logic determines whether the policy parameters specify a minimum number M of inclusion columns (block 654). If number M is specified, processing logic searches for groups with tuples from at least M number of the inclusion columns (block 660) and determines whether any such groups are found (i.e., the number of found groups is greater than 0) (block 662). If the determination made at block 662 is positive, processing logic proceeds to block 664. If the determination made at block 662 is negative, processing logic decides that no violation has been detected (block 680).

If number M is not specified (block 654), processing logic searches for groups with tuples from each specified inclusion column (block 656) and determines whether any such groups are found (block 658). If the determination made at block 658 is positive, processing logic proceeds to block 664. If the determination made at block 658 is negative, processing logic decides that no violation has been detected (block 680).

At block 664, processing logic determines whether the policy parameters specify any key words or expressions. If not, processing logic proceeds to block 670. If so, processing logic searches for groups with tuples matching the specified keywords or expressions (block 666) and determines whether any such groups are found (block 668). If the determination made at block 668 is positive, processing logic proceeds to block 670. If the determination made at block 668 is negative, processing logic decides that no violation has been detected (block 680).

At block 670, processing logic determines whether the policy parameters specify exclusion columns. If not, processing logic proceeds to block 676. If so, processing logic searches for groups with tuples that are not from all of the exclusion columns (block 672) and determines whether any such groups are found (block 674). If the determination made at block 672 is positive, processing logic proceeds to block 676. If the determination made at block 672 is negative, processing logic decides that no violation has been detected (block 680).

At block 676, processing logic determines whether the policy parameters specify a minimum number L of rows. If not, processing logic decides that a violation is detected (block 682). If so, processing logic determines whether the most recent number of found groups is not less than L (block 678). If this determination is positive, processing logic decides that a violation is detected (block 682). If the determination made at block 678 is negative, processing logic decides that no violation has been detected (block 680).

FIG. 6C illustrates an alternative exemplary embodiment of a method for determining whether any selected groups of tuple sets satisfy policy parameters.

Referring to FIG. 6C, processing logic begins with receiving parameter m that identifies the minimum number of inclusion columns (i.e., data source columns whose data needs to be included in the search result) (block 682).

Next, processing logic receives parameter S specifying the set of inclusion columns and confirms that |S| is greater or equal to m (block 684).

At block 686, processing logic receives parameter r specifying the minimum number of rows. Parameter r requires that the search result contain data from at least r rows of the source data.

At block 688, processing logic receives parameter E specifying a set of exclusion columns (i.e., data source columns whose data has to be excluded from the search result) and confirms that for each e member if E, |e| is equal to m.

At block 690, processing logic searches text T for the largest match group G in which:
(a) each components is a subset g of text T that contains tokens from the same row of data source D,
(b) each token from g is an element from a column in D specified by S,
(c) |g|>=m, and
(d) tokens of g do not contain data from exclusion columns E.

At block 692, processing logic determines whether |G| is greater than r. If so, processing logic decides that a match is detected (block 694). If not, processing logic decides that no match is detected (block 696).

Figure 7:
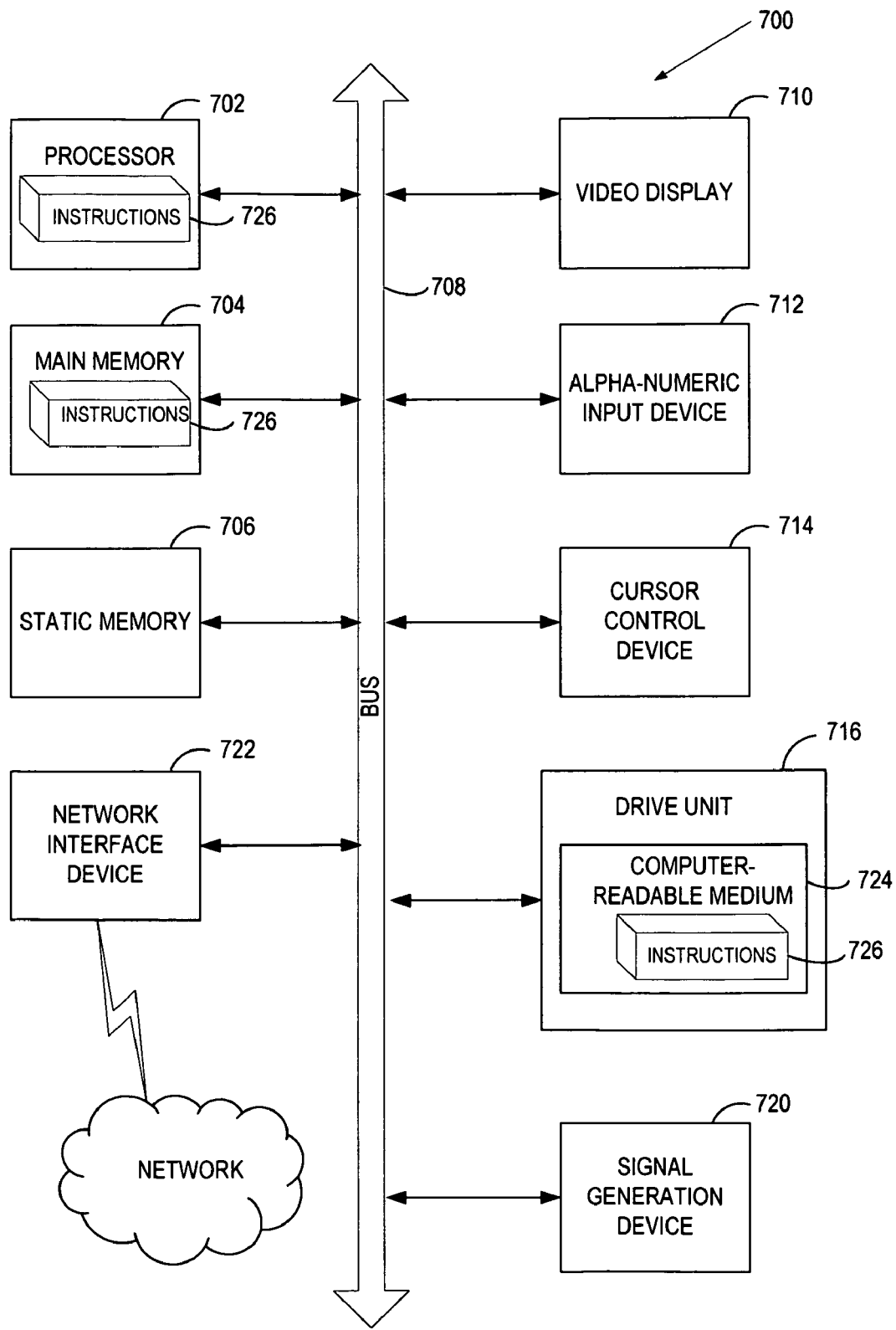
FIG. 7 is a block diagram of an exemplary computer system that may perform one or more of the operations described herein.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-accessible storage media. The software 722 may further be transmitted or received over a network 720 via the network interface device 708.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:
1. A computer-implemented method comprising:
identifying a policy for protecting source data having a tabular format, the source data containing one or more data fragments in a character-based language, wherein the character-based language does not provide visual delimiters between words in the one or more data fragments;
receiving information content having at least a first portion in the character-based language; and determining whether any part of the information content, including the first portion in the character-based language, violates the policy.

2. The method of claim 1 wherein:
the first portion of the information content does not include identifiable delimiters between tokens; and
the data fragments in the source data are separable into tokens based on the tabular data structure.

3. The method of claim 1 wherein the character-based language is any one of the Japanese language or the Chinese language.

4. The method of claim 1 wherein determining whether any part of the information content, including the first portion in the character-based language, violates the policy further comprises:
generating a first set of tokens from the first portion of the information content using an abstract data structure derived from the source data;
generating a second set of tokens from an information content portion in a word-based language using natural delimiters; and
determining whether the first and second sets of tokens include fragments from any one or more rows from the source data.

5. The method of claim 4 wherein:
the abstract data structure is created to provide an index of the source data, the index comprising signatures of data fragments within the source data; and
creating the abstract data structure comprises
identifying a plurality of tokens within the source data based on the tabular format,
for each token in a word-based language, creating a signature of a relevant token, and adding the signature to the abstract data structure, and
for each token in the character-based language, creating a token delimiter indicator and a signature of a relevant token, and adding the token delimiter indicator and the signature to the abstract data structure.

6. The method of claim 5 wherein generating a first set of tokens from the first portion of the information content using the abstract data structure comprises:
finding a token candidate in the first portion of the information content using a token delimiter indicator from a corresponding token identified in the abstract data structure;
generating a signature of the token candidate;
comparing the signature of the token candidate with a signature of the corresponding token from the abstract data structure; and
adding the token candidate to the first set of tokens if the signature of the token candidate matches the signature of the corresponding token from the abstract data structure.

7. The method of claim 5 wherein the token delimiter indicator comprises a value of a first character of the relevant token and the length of the relevant token.

8. The method of claim 7 further comprising:
maintaining all token delimiter indicators as an index with an index key being a value of a first character.

9. The method of claim 1 further comprising:
upon receiving the information content, converting character encodings associated with the information content into a Unicode standard.

10. The method of claim 5 further comprising:
prior to creating the abstract data structure, converting character encodings associated with the source data into a Unicode standard.

11. A computer-implemented method comprising:
identifying source data to be protected, the source data having a tabular format, the source data comprising one or more fragments in a character-based language, wherein the character-based language does not provide visual delimiters between words in the one or more fragments;
creating an abstract data structure from the source data, wherein creating the abstract data structure comprises:
identifying a plurality of tokens within the source data based on the tabular format,
creating a signature for each of the plurality of tokens, and
for each token in the character-based language, creating a token delimiter indicator; and
providing the abstract data structure to a data monitoring system to detect violations of one or more policies in information content containing data in the character-based language, the one or more policies being defined to protect the source data.

12. The method of claim 11 wherein the token delimiter indicator comprises a value of a first character of the relevant token and the length of the relevant token.

13. The method of claim 12 further comprising:
maintaining all token delimiter indicators as an index with an index key being a value of a first character.

14. The method of claim 11 wherein the character-based language is any one of the Japanese language or the Chinese language.

15. A system comprising:
a natural language identifier to receive information content having at least a first portion in a character-based language; and
a data monitoring component, coupled with the natural language identifier, to identify a policy for protecting source data having a tabular format, the source data containing one or more data fragments in the character-based language, wherein the character-based language does not provide visual delimiters between words in the one or more data fragments, and to determine whether any part of the information content, including the first portion in the character-based language, violates the policy.

16. The system of claim 15 wherein the data monitoring component comprises:
a tokenizer to generate a first set of tokens from the first portion of the information content using an abstract data structure derived from the source data, and to generate a second set of tokens from an information content portion in a word-based language using natural delimiters; and
a search engine, coupled to the tokenizer, to determine whether the first and second sets of tokens include fragments from any one or more rows from the source data.

17. The system of claim 16 further comprising a policy management system component, coupled to the data monitoring component, to create the abstract data structure by
identifying a plurality of tokens within the source data based on the tabular format,
for each token in a word-based language, creating a signature of a relevant token, and adding the signature to the abstract data structure, and
for each token in the character-based language, creating a token delimiter indicator and a signature of a relevant token, and adding the token delimiter indicator and the signature to the abstract data structure.

18. The system of claim 17 wherein the token delimiter indicator comprises a value of a first character of the relevant token and the length of the relevant token.

19. The system of claim 15 further comprising:
a Unicode converter, coupled to the natural language identifier, to convert character encodings associated with the information content into a Unicode standard.

20. A non-transitory computer readable storage medium that provides instructions, which when executed on a processing system cause the processing system to perform a method comprising:
identifying a policy for protecting source data having a tabular format, the source data containing one or more data fragments in a character-based language, wherein the character-based language does not provide visual delimiters between words in the one or more data fragments;
receiving information content having at least a first portion in the character-based language; and
determining whether any part of the information content, including the first portion in the character-based language, violates the policy.

21. The non-transitory computer readable storage medium of claim 20 wherein determining whether any part of the information content, including the first portion in the character-based language, violates the policy further comprises:
generating a first set of tokens from the first portion of the information content using an abstract data structure derived from the source data;
generating a second set of tokens from an information content portion in a word-based language using natural delimiters; and
determining whether the first and second sets of tokens include fragments from any one or more rows from the source data.

22. The non-transitory computer readable storage medium of claim 21 wherein:
the abstract data structure is created to provide an index of the source data, the index comprising signatures of data fragments within the source data; and
creating the abstract data structure comprises
identifying a plurality of tokens within the source data based on the tabular format,
for each token in a word-based language, creating a signature of a relevant token, and adding the signature to the abstract data structure, and
for each token in the character-based language, creating a token delimiter indicator and a signature of a relevant token, and adding the token delimiter indicator and the signature to the abstract data structure.

23. The non-transitory computer readable storage medium of claim 22 wherein generating a first set of tokens from the first portion of the information content using the abstract data structure comprises:
finding a token candidate in the first portion of the information content using a token delimiter indicator from a corresponding token identified in the abstract data structure;
generating a signature of the token candidate;
comparing the signature of the token candidate with a signature of the corresponding token from the abstract data structure; and
adding the token candidate to the first set of tokens if the signature of the token candidate matches the signature of the corresponding token from the abstract data structure.

24. The non-transitory computer readable storage medium of claim 23 wherein the token delimiter indicator comprises a value of a first character of the relevant token and the length of the relevant token.

25. The non-transitory computer readable storage medium of claim 20 wherein the method further comprises:
upon receiving the information content, converting character encodings associated with the information content into a Unicode standard.

\* \* \* \* \*